United States Patent
Tisch et al.

(10) Patent No.: US 12,153,331 B2
(45) Date of Patent: Nov. 26, 2024

(54) MICROPHONE PLACEMENT FOR WIND PROCESSING

(71) Applicant: GoPro, Inc., San Mateo, CA (US)

(72) Inventors: Erich Tisch, San Francisco, CA (US); Eric Steven Penrod, Brentwood, CA (US); Timothy Dick, San Francisco, CA (US); Mark Hardin, Santa Rosa, CA (US)

(73) Assignee: GoPro, Inc., San Mateo, CA (US)

( * ) Notice: Subject to any disclaimer, the term of this patent is extended or adjusted under 35 U.S.C. 154(b) by 129 days.

(21) Appl. No.: 17/903,098

(22) Filed: Sep. 6, 2022

(65) Prior Publication Data

US 2024/0077787 A1     Mar. 7, 2024

(51) Int. Cl.
  *G03B 17/02*   (2021.01)
  *G03B 17/55*   (2021.01)
  *H04N 23/55*   (2023.01)

(52) U.S. Cl.
  CPC ............ *G03B 17/02* (2013.01); *G03B 17/55* (2013.01); *H04N 23/55* (2023.01); *G03B 2217/002* (2013.01)

(58) Field of Classification Search
  USPC ........................................................ 396/535
  See application file for complete search history.

(56) References Cited

U.S. PATENT DOCUMENTS

| | | | | |
|---|---|---|---|---|
| 5,864,365 A * | 1/1999 | Sramek | ............ | G08B 13/19619 348/E5.026 |
| 5,973,920 A * | 10/1999 | Altic | ............ | G06F 1/203 361/679.52 |
| 5,978,221 A * | 11/1999 | Sawa | ............ | H01L 23/3737 428/313.5 |
| 10,205,930 B2 * | 2/2019 | Van Hoff | ............ | H04N 23/57 |
| 10,819,970 B2 * | 10/2020 | Van Hoff | ............ | H04N 23/662 |
| 2009/0322937 A1 * | 12/2009 | Young | ............ | H04N 23/51 348/E5.026 |
| 2015/0049243 A1 * | 2/2015 | Samuels | ............ | G03B 17/55 348/374 |
| 2015/0326748 A1 * | 11/2015 | Tisch | ............ | H04R 3/005 348/231.4 |
| 2024/0015433 A1 * | 1/2024 | Dick | ............ | H04R 3/005 |
| 2024/0073499 A1 * | 2/2024 | Vitale | ............ | H05K 7/2039 |
| 2024/0073500 A1 * | 2/2024 | Vitale | ............ | H04N 23/51 |

FOREIGN PATENT DOCUMENTS

KR     102294266 B1 *   8/2021
KR     102294269 B1 *   8/2021

* cited by examiner

*Primary Examiner* — Clayton E. LaBalle
*Assistant Examiner* — Warren K Fenwick
(74) *Attorney, Agent, or Firm* — Young Basile Hanlon & MacFarlane, P.C.

(57) ABSTRACT

Wind processing performance is improved by the placement of one or more microphones on a device. The device includes one or more microphones on the front surface, one or more microphones on the top surface, and one or more microphones on the rear surface. The rear surface is a heatsink, and the one or more microphones on the rear surface are located in recesses created by two or more fins of the heatsink. The device includes a processor that performs wind processing based on signals from the one or more microphones on the front surface, signals from the one or more microphones on the top surface, signals from the one or more microphones on the rear surface, or any combination thereof.

20 Claims, 7 Drawing Sheets

MICROPHONE PLACEMENT FOR WIND PROCESSING

TECHNICAL FIELD

This disclosure relates to microphone placement on electronic devices to reduce wind interference.

BACKGROUND

Electronic devices, such as image capture devices, have microphones that can be susceptible to wind interference that is caused by the geometry of the electronic device in windy conditions. Typical solutions to address wind interference include attachments, such as windsocks. Attachments can be easily lost or misplaced, and improved solutions to address wind interference are needed.

SUMMARY

Disclosed herein are implementations of devices for improved wind processing performance. In an aspect, an image capture device may include a first surface facing a first direction. The image capture device may include a lens disposed on the first surface. The image capture device may include a first microphone. The first microphone may be fluidly connected to a first microphone port that is disposed on the first surface. The image capture device may include a heatsink. The heatsink may include fins disposed on a second surface facing a second direction. The second direction may be diametrically opposed to the first direction. The image capture device may include a second microphone. The second microphone may be fluidly connected to a second microphone port. The second microphone port may be disposed on the second surface in a recessed portion of the fins.

In an aspect, an image capture device may include a first microphone. The first microphone may be fluidly connected to a first microphone port. The first microphone port may be disposed on a first surface of the image capture device. The image capture device may include a heatsink. The heatsink may include fins disposed on a second surface of the image capture device. The image capture device may include a second microphone. The second microphone may be fluidly connected to a second microphone port. The second microphone port may be disposed on the second surface in a recessed portion of the fins. The image capture device may include a third microphone. The third microphone may be fluidly connected to a third microphone port. The third microphone port may be disposed on a third surface of the image capture device. The third surface of the image capture device may extend between the first and second surfaces of the image capture device.

In an aspect, a microphone assembly may include a heatsink. The heatsink may include fins that are disposed on a surface. The fins may form a recessed area between each fin. The microphone assembly may include a microphone. The microphone may be fluidly connected to a microphone port. The microphone port may be disposed on the surface in the recessed area between two fins of the fins.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

The geometry and/or certain features of electronic devices, such as image capture devices, can cause localized turbulence in windy conditions. The localized turbulence results in audible wind interference, which is undesirable in recorded audio. The implementations described herein are configured to maximize wind performance (e.g., reduce audible wind interference) for the given device geometry by optimizing the placement of one or more microphones.

Figure 1A:
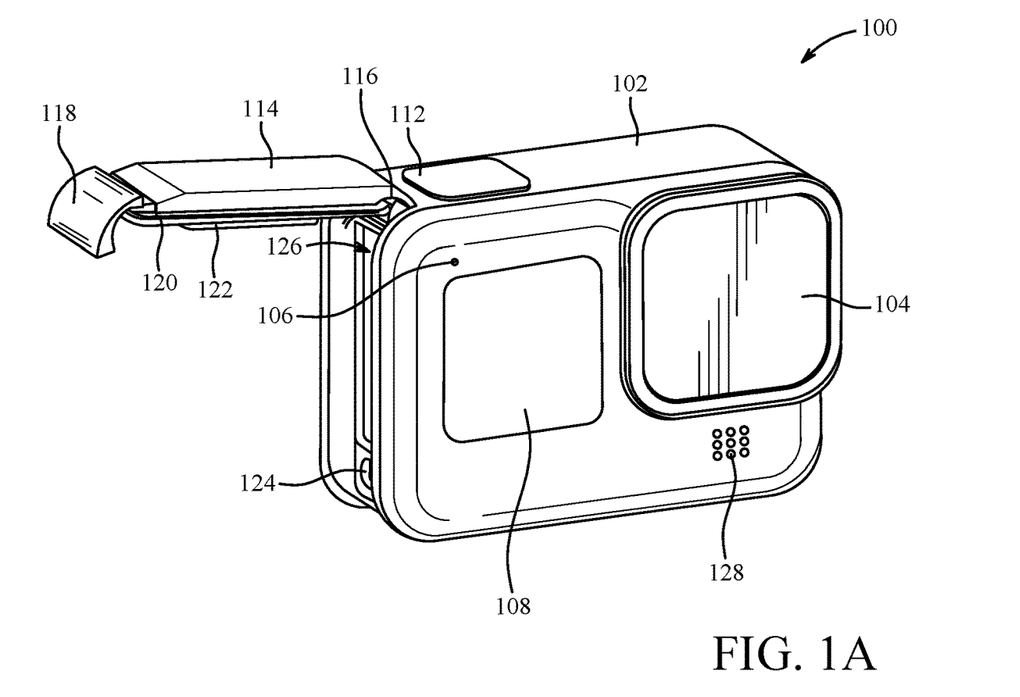
FIGS. 1A-B are isometric views of an example of an image capture device.
Figure 1B:
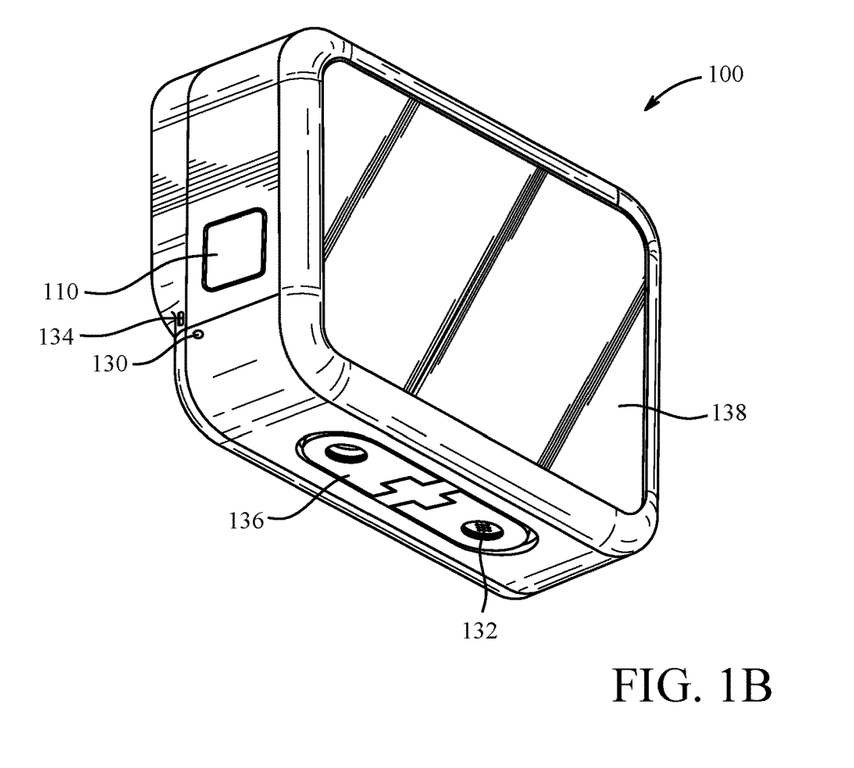

FIGS. 1A-B are isometric views of an example of an image capture device 100. The image capture device 100 may include a body 102, a lens 104 structured on a front surface of the body 102, various indicators on the front surface of the body 102 (such as light-emitting diodes (LEDs), displays, and the like), various input mechanisms (such as buttons, switches, and/or touch-screens), and electronics (such as imaging electronics, power electronics, etc.) internal to the body 102 for capturing images via the lens 104 and/or performing other functions. The lens 104 is configured to receive light incident upon the lens 104 and to direct received light onto an image sensor internal to the body 102. The image capture device 100 may be configured to capture images and video and to store captured images and video for subsequent display or playback.

The image capture device 100 may include an LED or another form of indicator 106 to indicate a status of the image capture device 100 and a liquid-crystal display (LCD) or other form of a display 108 to show status information such as battery life, camera mode, elapsed time, and the like. The image capture device 100 may also include a mode button 110 and a shutter button 112 that are configured to allow a user of the image capture device 100 to interact with the image capture device 100. For example, the mode button 110 and the shutter button 112 may be used to turn the image capture device 100 on and off, scroll through modes and settings, and select modes and change settings. The image capture device 100 may include additional buttons or interfaces (not shown) to support and/or control additional functionality.

The image capture device 100 may include a door 114 coupled to the body 102, for example, using a hinge mechanism 116. The door 114 may be secured to the body 102 using a latch mechanism 118 that releasably engages the body 102 at a position generally opposite the hinge mechanism 116. The door 114 may also include a seal 120 and a battery interface 122. When the door 114 is an open position, access is provided to an input-output (I/O) interface 124 for connecting to or communicating with external devices as described below and to a battery receptacle 126 for placement and replacement of a battery (not shown). The battery receptacle 126 includes operative connections (not shown) for power transfer between the battery and the image capture device 100. When the door 114 is in a closed position, the seal 120 engages a flange (not shown) or other interface to provide an environmental seal, and the battery interface 122 engages the battery to secure the battery in the battery receptacle 126. The door 114 can also have a removed position (not shown) where the entire door 114 is separated from the image capture device 100, that is, where both the hinge mechanism 116 and the latch mechanism 118 are decoupled from the body 102 to allow the door 114 to be removed from the image capture device 100.

The image capture device 100 may include a microphone 128 on a front surface and another microphone 130 on a side surface. The image capture device 100 may include other microphones on other surfaces (not shown). The microphones 128, 130 may be configured to receive and record audio signals in conjunction with recording video or separate from recording of video. The image capture device 100 may include a speaker 132 on a bottom surface of the image capture device 100. The image capture device 100 may include other speakers on other surfaces (not shown). The speaker 132 may be configured to play back recorded audio or emit sounds associated with notifications.

A front surface of the image capture device 100 may include a drainage channel 134. A bottom surface of the image capture device 100 may include an interconnect mechanism 136 for connecting the image capture device 100 to a handle grip or other securing device. In the example shown in FIG. 1B, the interconnect mechanism 136 includes folding protrusions configured to move between a nested or collapsed position as shown and an extended or open position (not shown) that facilitates coupling of the protrusions to mating protrusions of other devices such as handle grips, mounts, clips, or like devices.

The image capture device 100 may include an interactive display 138 that allows for interaction with the image capture device 100 while simultaneously displaying information on a surface of the image capture device 100.

The image capture device 100 of FIGS. 1A-B includes an exterior that encompasses and protects internal electronics. In the present example, the exterior includes six surfaces (i.e. a front face, a left face, a right face, a back face, a top face, and a bottom face) that form a rectangular cuboid. Furthermore, both the front and rear surfaces of the image capture device 100 are rectangular. In other embodiments, the exterior may have a different shape. The image capture device 100 may be made of a rigid material such as plastic, aluminum, steel, or fiberglass. The image capture device 100 may include features other than those described here. For example, the image capture device 100 may include additional buttons or different interface features, such as interchangeable lenses, cold shoes, and hot shoes that can add functional features to the image capture device 100.

The image capture device 100 may include various types of image sensors, such as charge-coupled device (CCD) sensors, active pixel sensors (APS), complementary metal-oxide-semiconductor (CMOS) sensors, N-type metal-oxide-semiconductor (NMOS) sensors, and/or any other image sensor or combination of image sensors.

Although not illustrated, in various embodiments, the image capture device 100 may include other additional electrical components (e.g., an image processor, camera system-on-chip (SoC), etc.), which may be included on one or more circuit boards within the body 102 of the image capture device 100.

The image capture device 100 may interface with or communicate with an external device, such as an external user interface device (not shown), via a wired or wireless computing communication link (e.g., the I/O interface 124). Any number of computing communication links may be used. The computing communication link may be a direct computing communication link or an indirect computing communication link, such as a link including another device or a network, such as the internet, may be used.

In some implementations, the computing communication link may be a Wi-Fi link, an infrared link, a Bluetooth (BT) link, a cellular link, a ZigBee link, a near field communications (NFC) link, such as an ISO/IEC 20643 protocol link, an Advanced Network Technology interoperability (ANT+) link, and/or any other wireless communications link or combination of links.

In some implementations, the computing communication link may be an HDMI link, a USB link, a digital video interface link, a display port interface link, such as a Video Electronics Standards Association (VESA) digital display interface link, an Ethernet link, a Thunderbolt link, and/or other wired computing communication link.

The image capture device 100 may transmit images, such as panoramic images, or portions thereof, to the external user interface device via the computing communication link, and the external user interface device may store, process, display, or a combination thereof the panoramic images.

The external user interface device may be a computing device, such as a smartphone, a tablet computer, a phablet, a smart watch, a portable computer, personal computing device, and/or another device or combination of devices configured to receive user input, communicate information with the image capture device 100 via the computing communication link, or receive user input and communicate information with the image capture device 100 via the computing communication link.

The external user interface device may display, or otherwise present, content, such as images or video, acquired by the image capture device 100. For example, a display of the external user interface device may be a viewport into the three-dimensional space represented by the panoramic images or video captured or created by the image capture device 100.

The external user interface device may communicate information, such as metadata, to the image capture device 100. For example, the external user interface device may send orientation information of the external user interface device with respect to a defined coordinate system to the image capture device 100, such that the image capture device 100 may determine an orientation of the external user interface device relative to the image capture device 100.

Based on the determined orientation, the image capture device 100 may identify a portion of the panoramic images or video captured by the image capture device 100 for the image capture device 100 to send to the external user interface device for presentation as the viewport. In some implementations, based on the determined orientation, the image capture device 100 may determine the location of the external user interface device and/or the dimensions for viewing of a portion of the panoramic images or video.

The external user interface device may implement or execute one or more applications to manage or control the image capture device 100. For example, the external user interface device may include an application for controlling camera configuration, video acquisition, video display, or any other configurable or controllable aspect of the image capture device 100.

The user interface device, such as via an application, may generate and share, such as via a cloud-based or social media service, one or more images, or short video clips, such as in response to user input. In some implementations, the external user interface device, such as via an application, may remotely control the image capture device 100 such as in response to user input.

The external user interface device, such as via an application, may display unprocessed or minimally processed images or video captured by the image capture device 100 contemporaneously with capturing the images or video by the image capture device 100, such as for shot framing or live preview, and which may be performed in response to user input. In some implementations, the external user interface device, such as via an application, may mark one or more key moments contemporaneously with capturing the images or video by the image capture device 100, such as with a tag or highlight in response to a user input or user gesture.

The external user interface device, such as via an application, may display or otherwise present marks or tags associated with images or video, such as in response to user input. For example, marks may be presented in a camera roll application for location review and/or playback of video highlights.

The external user interface device, such as via an application, may wirelessly control camera software, hardware, or both. For example, the external user interface device may include a web-based graphical interface accessible by a user for selecting a live or previously recorded video stream from the image capture device 100 for display on the external user interface device.

The external user interface device may receive information indicating a user setting, such as an image resolution setting (e.g., 3840 pixels by 2160 pixels), a frame rate setting (e.g., 60 frames per second (fps)), a location setting, and/or a context setting, which may indicate an activity, such as mountain biking, in response to user input, and may communicate the settings, or related information, to the image capture device 100.

Figure 2A:
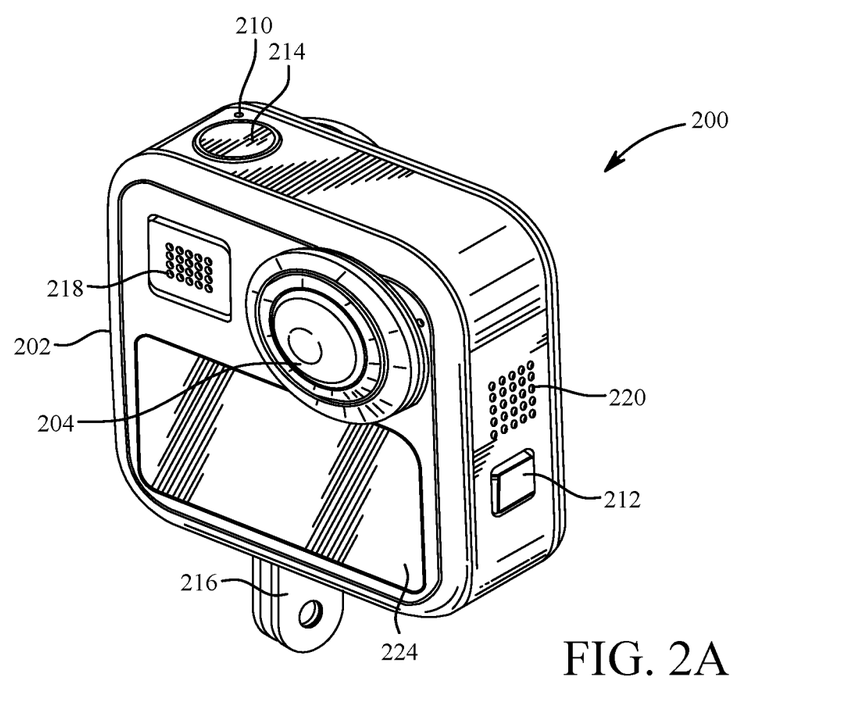
FIGS. 2A-B are isometric views of another example of an image capture device.
Figure 2B:
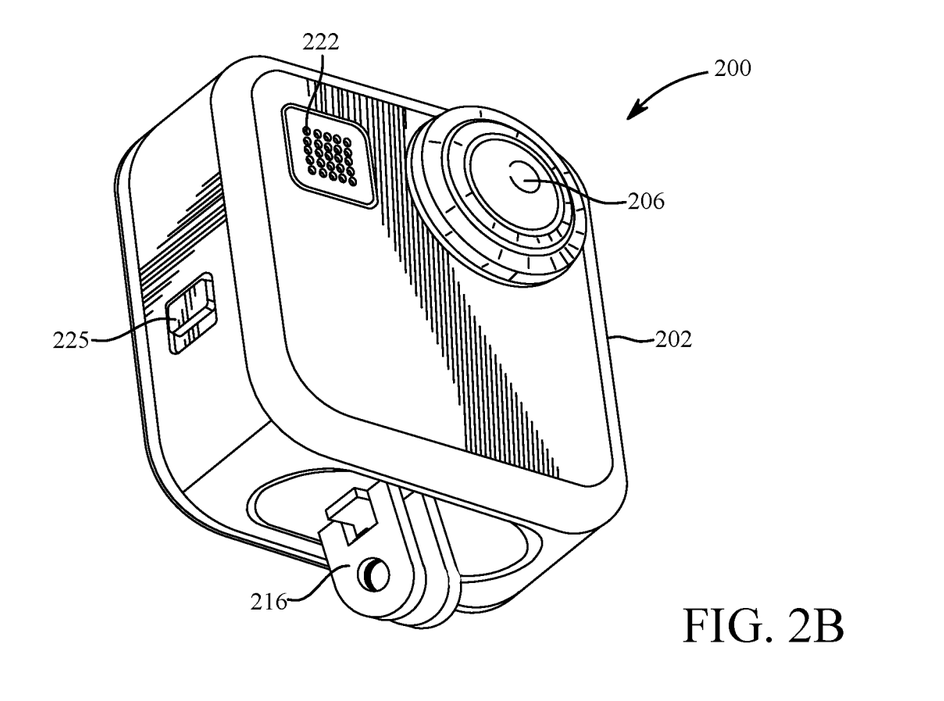

FIGS. 2A-B illustrate another example of an image capture device 200. The image capture device 200 includes a body 202 and two camera lenses 204 and 206 disposed on opposing surfaces of the body 202, for example, in a back-to-back configuration, Janus configuration, or offset Janus configuration. The body 202 of the image capture device 200 may be made of a rigid material such as plastic, aluminum, steel, or fiberglass.

The image capture device 200 includes various indicators on the front of the surface of the body 202 (such as LEDs, displays, and the like), various input mechanisms (such as buttons, switches, and touch-screen mechanisms), and electronics (e.g., imaging electronics, power electronics, etc.) internal to the body 202 that are configured to support image capture via the two camera lenses 204 and 206 and/or perform other imaging functions.

The image capture device 200 includes various indicators, for example, LED 210 to indicate a status of the image capture device 100. The image capture device 200 may include a mode button 212 and a shutter button 214 configured to allow a user of the image capture device 200 to interact with the image capture device 200, to turn the image capture device 200 on, and to otherwise configure the operating mode of the image capture device 200. It should be appreciated, however, that, in alternate embodiments, the image capture device 200 may include additional buttons or inputs to support and/or control additional functionality.

The image capture device 200 may include an interconnect mechanism 216 for connecting the image capture device 200 to a handle grip or other securing device. In the example shown in FIGS. 2A and 2B, the interconnect mechanism 216 includes folding protrusions configured to move between a nested or collapsed position (not shown) and an extended or open position as shown that facilitates coupling of the protrusions to mating protrusions of other devices such as handle grips, mounts, clips, or like devices.

The image capture device 200 may include audio components 218, 220, 222 such as microphones configured to receive and record audio signals (e.g., voice or other audio commands) in conjunction with recording video. The audio component 218, 220, 222 can also be configured to play back audio signals or provide notifications or alerts, for example, using speakers. Placement of the audio components 218, 220, 222 may be on one or more of several surfaces of the image capture device 200. In the example of FIGS. 2A and 2B, the image capture device 200 includes three audio components 218, 220, 222, with the audio component 218 on a front surface, the audio component 220 on a side surface, and the audio component 222 on a back surface of the image capture device 200. Other numbers and configurations for the audio components are also possible.

The image capture device 200 may include an interactive display 224 that allows for interaction with the image capture device 200 while simultaneously displaying information on a surface of the image capture device 200. The interactive display 224 may include an I/O interface, receive touch inputs, display image information during video capture, and/or provide status information to a user. The status information provided by the interactive display 224 may include battery power level, memory card capacity, time elapsed for a recorded video, etc.

The image capture device 200 may include a release mechanism 225 that receives a user input to in order to change a position of a door (not shown) of the image capture device 200. The release mechanism 225 may be used to open the door (not shown) in order to access a battery, a battery receptacle, an I/O interface, a memory card interface, etc. (not shown) that are similar to components described in respect to the image capture device 100 of FIGS. 1A and 1B.

In some embodiments, the image capture device 200 described herein includes features other than those described. For example, instead of the I/O interface and the interactive display 224, the image capture device 200 may include additional interfaces or different interface features. For example, the image capture device 200 may include additional buttons or different interface features, such as interchangeable lenses, cold shoes, and hot shoes that can add functional features to the image capture device 200.

Figure 3:
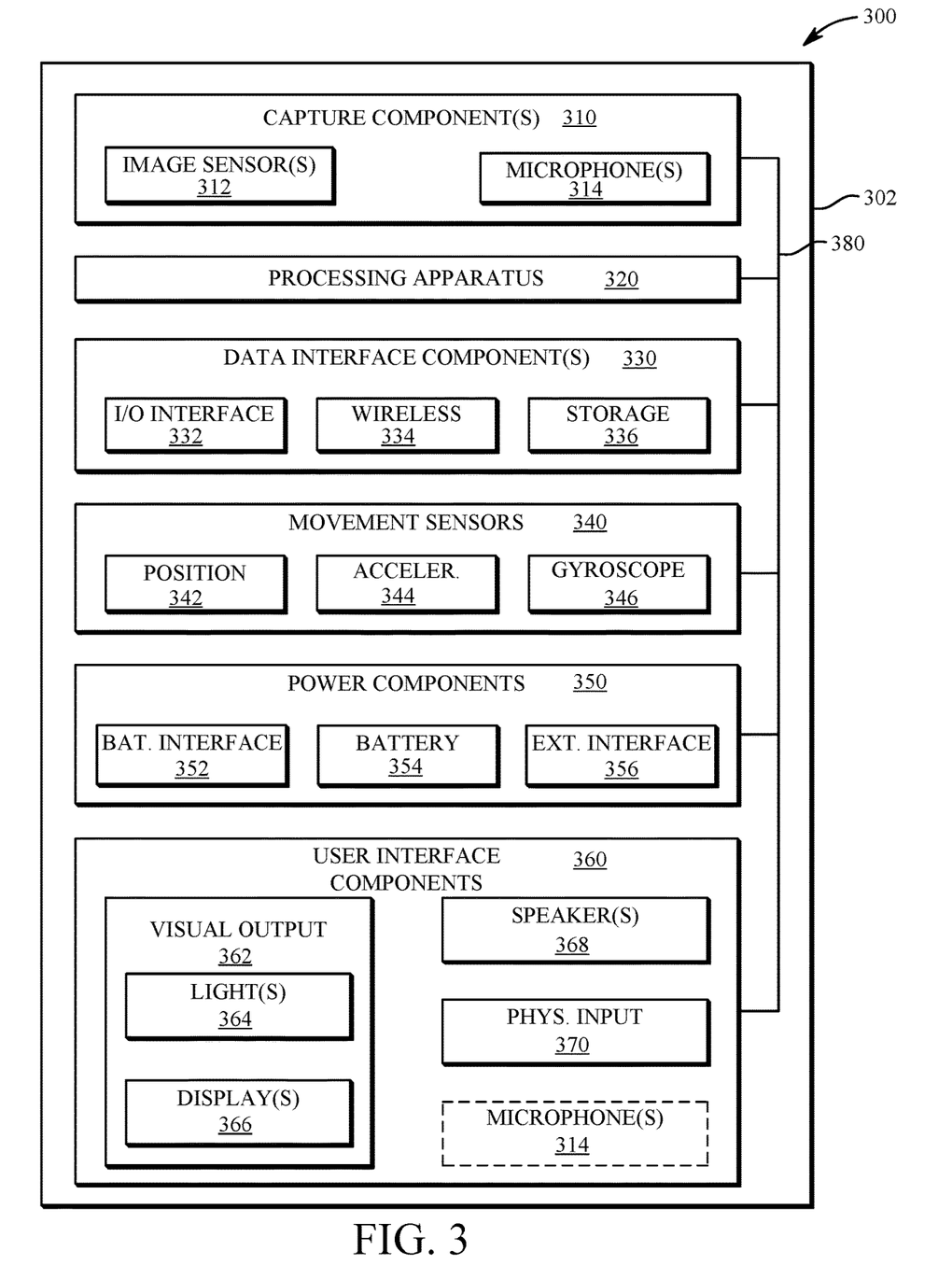
FIG. 3 is a block diagram of electronic components of an image capture device.

FIG. 3 is a block diagram of electronic components in an image capture device 300. The image capture device 300 may be a single-lens image capture device, a multi-lens image capture device, or variations thereof, including an image capture device with multiple capabilities such as use of interchangeable integrated sensor lens assemblies. The description of the image capture device 300 is also applicable to the image capture devices 100, 200 of FIGS. 1A-B and 2A-B.

The image capture device 300 includes a body 302 which includes electronic components such as capture components 310, a processing apparatus 320, data interface components 330, movement sensors 340, power components 350, and/or user interface components 360.

The capture components 310 include one or more image sensors 312 for capturing images and one or more microphones 314 for capturing audio.

The image sensor(s) 312 is configured to detect light of a certain spectrum (e.g., the visible spectrum or the infrared spectrum) and convey information constituting an image as electrical signals (e.g., analog or digital signals). The image sensor(s) 312 detects light incident through a lens coupled or connected to the body 302. The image sensor(s) 312 may be any suitable type of image sensor, such as a charge-coupled device (CCD) sensor, active pixel sensor (APS), complementary metal-oxide-semiconductor (CMOS) sensor, N-type metal-oxide-semiconductor (NMOS) sensor, and/or any other image sensor or combination of image sensors. Image signals from the image sensor(s) 312 may be passed to other electronic components of the image capture device 300 via a bus 380, such as to the processing apparatus 320. In some implementations, the image sensor(s) 312 includes a digital-to-analog converter. A multi-lens variation of the image capture device 300 can include multiple image sensors 312.

The microphone(s) 314 is configured to detect sound, which may be recorded in conjunction with capturing images to form a video. The microphone(s) 314 may also detect sound in order to receive audible commands to control the image capture device 300.

The processing apparatus 320 may be configured to perform image signal processing (e.g., filtering, tone mapping, stitching, and/or encoding) to generate output images based on image data from the image sensor(s) 312. The processing apparatus 320 may include one or more processors having single or multiple processing cores. In some implementations, the processing apparatus 320 may include an application specific integrated circuit (ASIC). For example, the processing apparatus 320 may include a custom image signal processor. The processing apparatus 320 may exchange data (e.g., image data) with other components of the image capture device 300, such as the image sensor(s) 312, via the bus 380.

The processing apparatus 320 may include memory, such as a random-access memory (RAM) device, flash memory, or another suitable type of storage device, such as a non-transitory computer-readable memory. The memory of the processing apparatus 320 may include executable instructions and data that can be accessed by one or more processors of the processing apparatus 320. For example, the processing apparatus 320 may include one or more dynamic random-access memory (DRAM) modules, such as double data rate synchronous dynamic random-access memory (DDR SDRAM). In some implementations, the processing apparatus 320 may include a digital signal processor (DSP). More than one processing apparatus may also be present or associated with the image capture device 300.

The data interface components 330 enable communication between the image capture device 300 and other electronic devices, such as a remote control, a smartphone, a tablet computer, a laptop computer, a desktop computer, or a storage device. For example, the data interface components 330 may be used to receive commands to operate the image capture device 300, transfer image data to other electronic devices, and/or transfer other signals or information to and from the image capture device 300. The data interface components 330 may be configured for wired and/or wireless communication. For example, the data interface components 330 may include an I/O interface 332 that provides wired communication for the image capture device, which may be a USB interface (e.g., USB type-C), a high-definition multimedia interface (HDMI), or a FireWire interface. The data interface components 330 may include a wireless data interface 334 that provides wireless communication for the image capture device 300, such as a Bluetooth interface, a ZigBee interface, and/or a Wi-Fi interface. The data interface components 330 may include a storage interface 336, such as a memory card slot configured to receive and operatively couple to a storage device (e.g., a memory card) for data transfer with the image capture device 300 (e.g., for storing captured images and/or recorded audio and video).

The movement sensors 340 may detect the position and movement of the image capture device 300. The movement sensors 340 may include a position sensor 342, an accelerometer 344, or a gyroscope 346. The position sensor 342, such as a global positioning system (GPS) sensor, is used to determine a position of the image capture device 300. The accelerometer 344, such as a three-axis accelerometer, measures linear motion (e.g., linear acceleration) of the image capture device 300. The gyroscope 346, such as a three-axis gyroscope, measures rotational motion (e.g., rate of rotation) of the image capture device 300. Other types of movement sensors 340 may also be present or associated with the image capture device 300.

The power components 350 may receive, store, and/or provide power for operating the image capture device 300. The power components 350 may include a battery interface 352 and a battery 354. The battery interface 352 operatively couples to the battery 354, for example, with conductive contacts to transfer power from the battery 354 to the other electronic components of the image capture device 300. The power components 350 may also include an external interface 356, and the power components 350 may, via the external interface 356, receive power from an external source, such as a wall plug or external battery, for operating the image capture device 300 and/or charging the battery 354 of the image capture device 300. In some implementations, the external interface 356 may be the I/O interface 332. In such an implementation, the I/O interface 332 may enable the power components 350 to receive power from an external source over a wired data interface component (e.g., a USB type-C cable).

The user interface components 360 may allow the user to interact with the image capture device 300, for example, providing outputs to the user and receiving inputs from the user. The user interface components 360 may include visual output components 362 to visually communicate information and/or present captured images to the user. The visual output components 362 may include one or more lights 364 and/or more displays 366. The display(s) 366 may be configured as a touch screen that receives inputs from the user. The user interface components 360 may also include one or more speakers 368. The speaker(s) 368 can function as an audio output component that audibly communicates information and/or presents recorded audio to the user. The user interface components 360 may also include one or more physical input interfaces 370 that are physically manipulated by the user to provide input to the image capture device 300. The physical input interfaces 370 may, for example, be configured as buttons, toggles, or switches. The user interface components 360 may also be considered to include the microphone(s) 314, as indicated in dotted line, and the microphone(s) 314 may function to receive audio inputs from the user, such as voice commands.

Figure 4A:
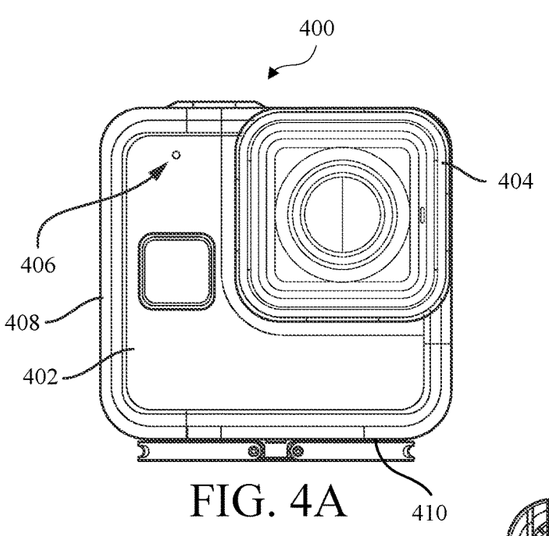
FIG. 4A is a front-view of an example of an image capture device showing a front microphone.

FIG. 4A is a front-view of an example of an image capture device 400. The image capture device 400 includes a front face 402 that forms a portion of a body of the image capture device 400. A lens 404 is disposed on the front face 402. A front microphone port 406 is disposed on the front face 402. The front microphone port 406 is fluidly connected to a front microphone (not shown) that is disposed in an interior portion of the body of the image capture device 400. In this example, the front microphone port 406 is disposed on the front face 402 between the lens 404 and a side face 408 that forms a portion of the body of the image capture device 400. In some examples, the front microphone port 406 may be disposed on the front face 402 near the intersection between the front face 402 and the side face 408 to avoid detecting noise caused by turbulence from wind directed at the lens 404. In some examples, the front microphone port 406 may be disposed on the front face between the lens 404 and a bottom face 410 that forms a portion of the body of the image capture device 400. In some wind scenarios, wind processing performance may be improved when the front microphone port 406 is disposed on the front face 402 between the lens 404 and the side face 408 compared to when the front microphone port 406 is disposed on the front face 402 between the lens 404 and the bottom face 410.

Figure 4B:
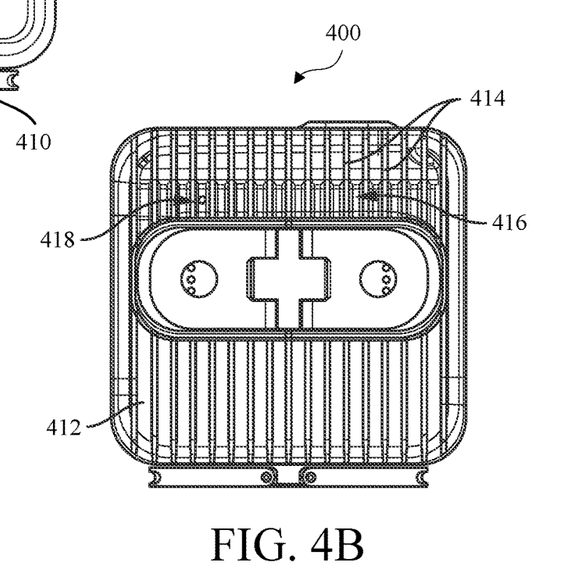
FIG. 4B is a rear-view of the image capture device shown in FIG. 4A showing a rear microphone.

FIG. 4B is a rear-view of the image capture device 400 shown in FIG. 4A. The image capture device 400 includes a rear face 412 that forms a portion of the body of the image capture device 400. The rear face 412 faces an opposite direction relative to the front face 402 shown in FIG. 4A. The front face 402 and the rear face 412 are connected by the side face 408 to form a portion of the body of the image capture device 400. The side face 408 may be perpendicular or substantially perpendicular to the front face 402 and the rear face 412. The rear face 412 is a heatsink that includes fins 414 and recesses 416 between the fins 414. The rear face 412 may be constructed of a metal or a ceramic material. A rear microphone port 418 is disposed on the rear face 412 in a recess 416 between the fins 414. The rear microphone port 418 is disposed at a location on the rear face 412 that opposes the lens 404 on the front face 402. The rear microphone port 418 is fluidly connected to a rear microphone (not shown) that is disposed in an interior portion of the body of the image capture device 400. In the examples shown in FIGS. 4A and 4B, the front microphone port 406 and the rear microphone port 418 are offset diametrically on opposing faces of the image capture device 400. In some examples, the front microphone port 406 and the rear microphone port may be in a back-to-back configuration (or substantially thereof) on opposing faces of the image capture device 400. In some examples, wind processing performance may be improved as the distance between the front microphone port 406 and the rear microphone port 418 increases. The acoustic diffraction effects can be kept to a minimum based on the placement of the microphones, which allows a more seamless combination of the microphone signals.

Figure 4C:
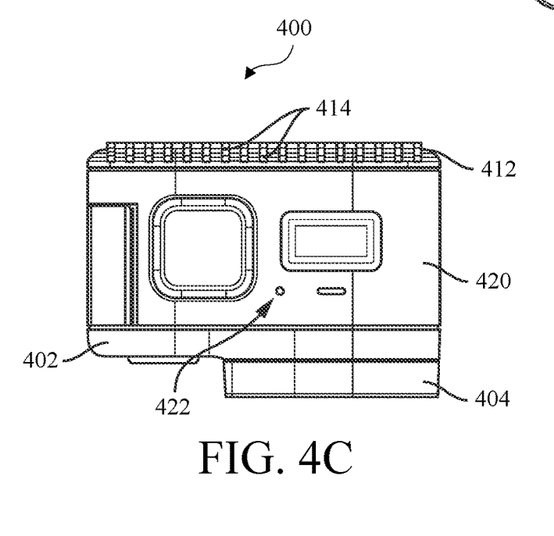
FIG. 4C is a top-view of the image capture device shown in FIG. 4A showing a top microphone.

FIG. 4C is a top-view of the image capture device 400 shown in FIG. 4A. The image capture device 400 includes a top face 420 that forms a portion of the body of the image capture device 400. The front face 402 and the rear face 412 are connected by the top face 420 to form a portion of the body of the image capture device 400. The top face 420 may be perpendicular or substantially perpendicular to the front face 402 and the rear face 412. The top face 420 is perpendicular or substantially perpendicular to the side face 408 and connected to the side face 408. A top microphone port 422 is disposed on the top face 420. The top microphone port 422 is fluidly connected to a top microphone (not shown) that is disposed in an interior portion of the body of the image capture device 400.

The front microphone, the rear microphone, the top microphone, or any combination thereof, can be used for wind processing. Wind processing is performed on one or more microphone signals to reduce the noise created by turbulence caused by wind in each microphone signal. The wind processing may be performed by a processor such as the processing apparatus 320 shown in FIG. 3. In a first example, the processor is configured to perform wind processing based on a microphone signal from the front microphone, a microphone signal from the rear microphone, and a microphone signal from the top microphone. In a second example, the processor is configured to perform wind processing based on a microphone signal from the front microphone and a microphone signal from the top microphone. In a third example, the processor is configured to perform wind processing based on a microphone signal from the rear microphone and a microphone signal from the top microphone. In a fourth example, the processor is configured to perform wind processing based on a microphone signal from the front microphone and a microphone signal from the rear microphone.

Figure 5A:
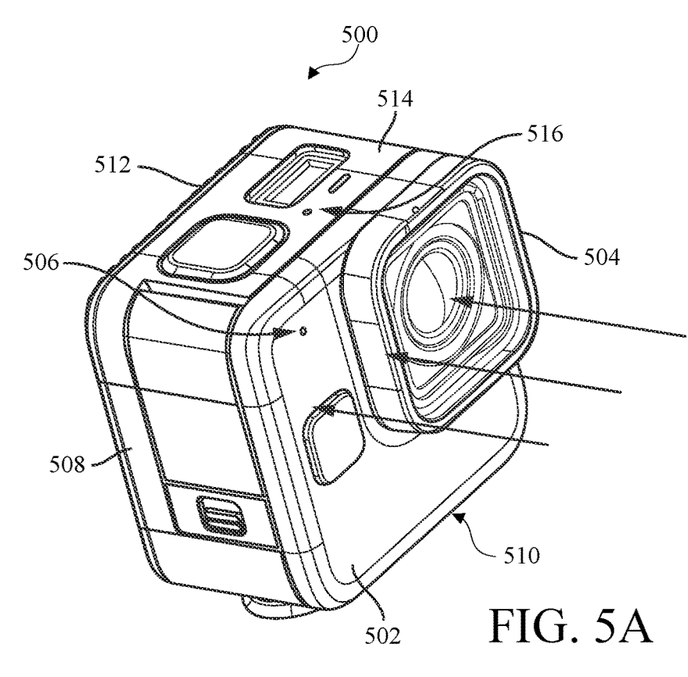
FIG. 5A is an isometric view of an example of an image capture device showing wind directed at the front of the image capture device.

FIG. 5A is an isometric view of an example of an image capture device 500 showing wind (depicted as large arrows) directed at a front face 502 of the image capture device 500. The front face 502 forms a portion of a body of the image capture device 500. A lens 504 is disposed on the front face 502. A front microphone port 506 is disposed on the front face 502. The front microphone port 506 is fluidly connected to a front microphone (not shown) that is disposed in an interior portion of the body of the image capture device 500. In this example, the front microphone port 506 is disposed on the front face 502 between the lens 504 and a side face 508 that forms a portion of the body of the image capture device 500. Wind processing performance can be improved as the distance between the front microphone port 506 and the lens 504 increases. For example, the front microphone port 506 may be disposed on the front face 502 near the intersection between the front face 502 and the side face 508 to avoid detecting noise caused by turbulence from wind directed at the lens 504. In some examples, the front microphone port 506 may be disposed on the front face between the lens 504 and a bottom face 510 that forms a portion of the body of the image capture device 400.

The image capture device 500 includes a rear face 512 that forms a portion of the body of the image capture device 500. The rear face 512 faces an opposite direction relative to the front face 502. The front face 502 and the rear face 512 are connected by the side face 508 to form a portion of the body of the image capture device 500. The side face 508 may be perpendicular or substantially perpendicular to the front face 502 and the rear face 512. The rear face 512 is a heatsink that includes fins and recesses, such as the fins 414 and the recesses 416 shown in FIG. 4B.

The image capture device 500 includes a top face 514 that forms a portion of the body of the image capture device 500.

The front face 502 and the rear face 512 are connected by the top face 514 to form a portion of the body of the image capture device 500. The top face 514 may be perpendicular or substantially perpendicular to the front face 502 and the rear face 512. The top face 514 is perpendicular or substantially perpendicular to the side face 508 and connected to the side face 508. A top microphone port 516 is disposed on the top face 514. The top microphone port 516 is fluidly connected to a top microphone (not shown) that is disposed in an interior portion of the body of the image capture device 500.

As shown in FIG. 5A, wind (depicted as large arrows) is directed at the front face 502 of the image capture device 500. This wind scenario may be experienced in various situations, such as when the image capture device 500 is mounted on a vehicle, such as an automobile, boat, or bicycle. When the wind is directed at the front face 502 of the image capture device 500, turbulence is created by the lens 504. The turbulence can be detected by the front microphone as noise, which is undesirable. When wind is directed at the front face 502, the front microphone produces the strongest signal. If the front microphone is positioned close to the lens 504, the signal can be degraded by turbulence caused by the wind deflected from the lens 504. For a wind scenario where the wind is directed at the front face 502 of the image capture device 500, wind processing performance can be improved as the distance between the front microphone port 506 and the lens 504 increases.

Figure 5B:
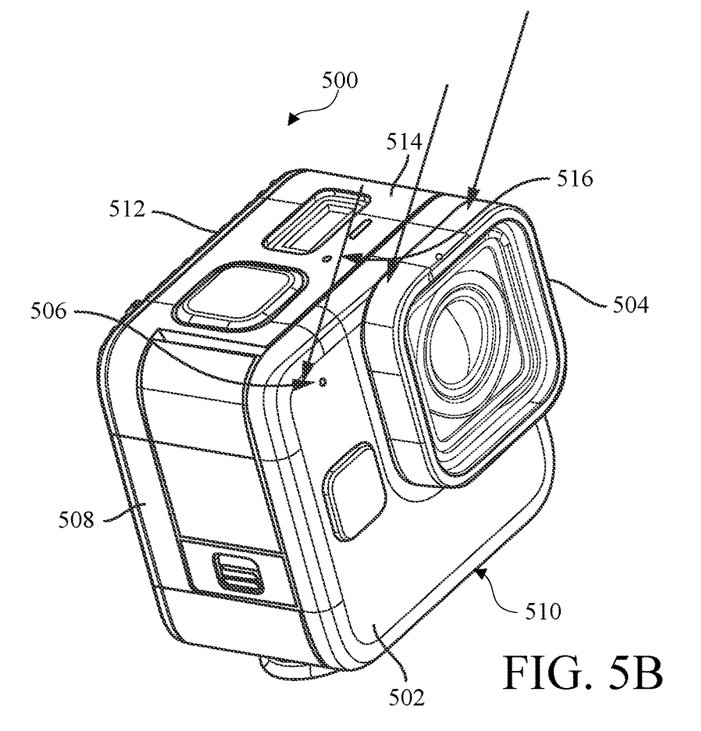
FIG. 5B is an isometric view of the image capture device shown in FIG. 5A showing wind directed at the top of the image capture device.

FIG. 5B is an isometric view of the image capture device 500 shown in FIG. 5A showing wind (depicted as large arrows) directed at the top face 514 of the image capture device 500. This wind scenario may be experienced in various situations, such as when the image capture device 500 is mounted on a helmet and the user of the helmet is looking down. When the wind is directed at the top face 514 of the image capture device 500, turbulence is created by the lens 504. The turbulence can be detected by the front microphone and/or top microphone 516 as noise, which is undesirable. For a wind scenario where the wind is directed at the top face 514 of the image capture device 500, wind processing performance can be improved as the distance between the front microphone port 506 and the lens 504 increases. In this particular wind scenario, poor wind processing performance would be expected if the front microphone port was located in an area between the lens 504 and the bottom face 510 due to increased turbulence in that area caused by the lens 504.

Figure 5C:
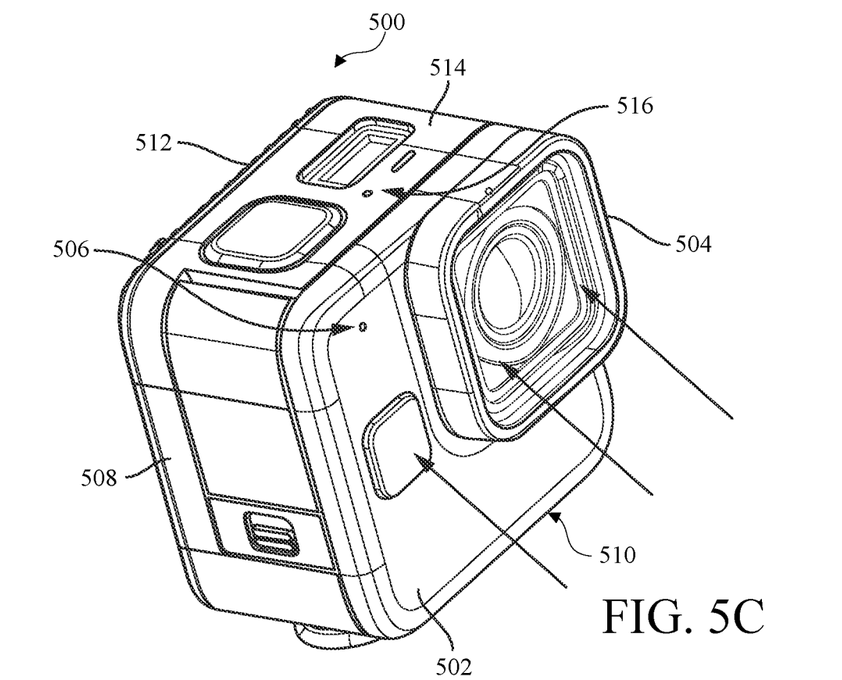
FIG. 5C is an isometric view of the image capture device shown in FIG. 5A showing wind directed at the bottom of the image capture device.

FIG. 5C is an isometric view of the image capture device shown in FIG. 5A showing wind (depicted as large arrows) directed at the bottom face 510 of the image capture device 500. This wind scenario may be experienced in various situations, such as when the image capture device 500 is mounted on a helmet and the user of the helmet is looking up. When the wind is directed at the bottom face 510 of the image capture device 500, turbulence is created by the lens 504. The turbulence can be detected by the front microphone as noise, which is undesirable. For a wind scenario where the wind is directed at the bottom face 510 of the image capture device 500, wind processing performance can be improved as the distance between the front microphone port 506 and the lens 504 increases.

Figure 5D:
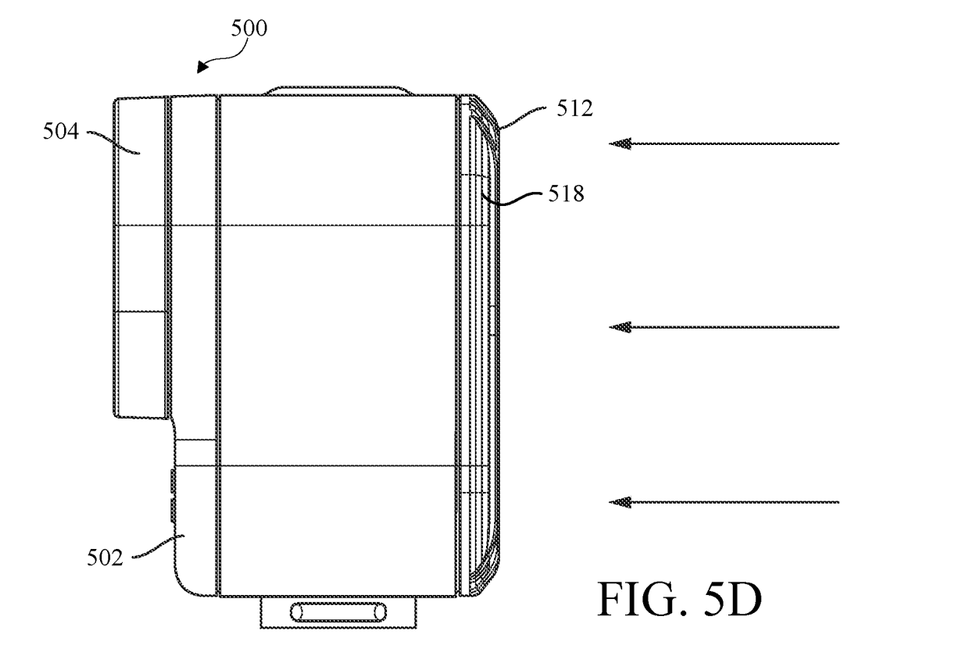
FIG. 5D is an isometric view of the image capture device shown in FIG. 5A showing wind directed at the rear of the image capture device.

FIG. 5D is an isometric view of the image capture device 500 shown in FIG. 5A showing wind (depicted as large arrows) directed at the rear face 512 of the image capture device 500. In this example, a rear microphone port 518 is shown. The rear microphone port 518 may be the rear microphone port 418 shown in FIG. 4B. This wind scenario may be experienced in various situations, such as when the image capture device 500 is being used in a "selfie mode" where the lens 504 is directed towards the user and the rear face 512 is directed towards the direction of travel. When the wind is directed at the rear face 512 of the image capture device 500, turbulence is created by the fins and recesses of the heatsink. The turbulence can be detected by the rear microphone as noise, which is undesirable. For a wind scenario where the wind is directed at the rear face 512 of the image capture device 500, wind processing performance can be performed by processing the microphone signals from the front microphone, the top microphone, and the rear microphone.

By placing the rear microphone port 518 on the opposite corner of the image capture device 500 with respect to the front microphone port 506, the likelihood of producing a clean microphone signal increases when wind is approaching from either side of the image capture device 500. Accordingly, placing a microphone closer to a leading edge and another microphone farther from the leading edge when wind is approaching from a side can improve microphone performance. The lateral offset placement of the front and rear microphones may avoid turbulence caused by mounting devices, such as rear fingers, when they are deployed in mounting scenarios. Including the top microphone in combination with the front and rear microphones may provide the highest likelihood of producing a clean microphone signal for wind processing since there are no microphones placed on either of the side faces.

Improved wind processing performance can be achieved in cases of upstream turbulence by placing the rear microphone port 518 on the rear face 512 of the image capture device 500. For example, when relatively laminar wind is directed towards the front face 502, the front microphone may detect the least wind noise of the three microphones. When wind contains upstream turbulence, for example from other vehicles or mounts, the rear microphone can be leveraged for improved wind processing performance.

Figure 6:
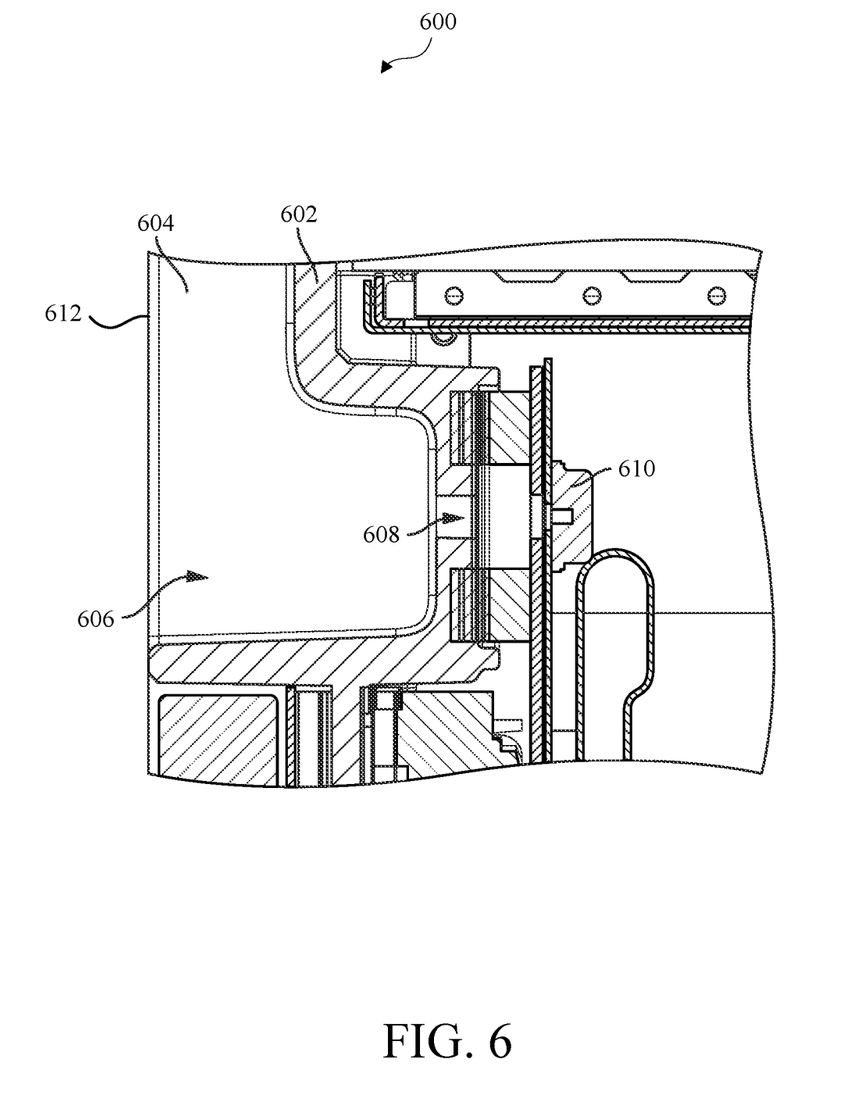
FIG. 6 is a cross-sectional view of an example of a microphone assembly disposed in a recessed portion of a heatsink fin.

FIG. 6 is a cross-sectional view of an example of a microphone assembly 600. The microphone assembly 600 includes a heatsink 602. The heatsink 602 forms the rear face 412 shown in FIGS. 4B-C and the rear face 512 shown in FIGS. 5A-D. The heatsink 602 may be constructed of a metal or ceramic material. The heatsink 602 includes a fin portion 604, a recessed portion 606, and a microphone port 608. The microphone port 608 may be the rear microphone port 418 shown in FIG. 4B or the rear microphone port 518 shown in FIG. 5D. The microphone port 608 is fluidly connected to a microphone 610 that is disposed in an internal area of a device body that is formed by a portion of the heatsink 602. As shown in FIG. 6, the microphone port 608 is recessed between the fins of the heatsink 602 such that it is disposed below an outer surface 612 of the fins. Since the microphone 610 is embedded in the heatsink 602, the microphone 610 may be less susceptible to vibration noise.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An image capture device, comprising:
   a first surface facing a first direction;
   a lens disposed on the first surface;
   a first microphone fluidly connected to a first microphone port disposed on the first surface;
   a heatsink comprising fins disposed on a second surface facing a second direction, wherein the second direction is diametrically opposed to the first direction; and
   a second microphone fluidly connected to a second microphone port disposed on the second surface in a recessed portion of the fins.

2. The image capture device of claim 1, wherein the first microphone and the second microphone are offset diametrically relative to a third surface that is perpendicular to the first surface and the second surface.

3. The image capture device of claim 1, wherein the first and second microphone ports are disposed on opposite sides of a plane that bisects the first and second surfaces of the image capture device.

4. The image capture device of claim 1, further comprising:
   a third microphone fluidly connected to a third microphone port disposed on a third surface that extends between the first and second surfaces.

5. The image capture device of claim 4, further comprising:
   a processor configured to perform wind processing based on a first microphone signal from the first microphone, a second microphone signal from the second microphone, and a third microphone signal from the third microphone.

6. The image capture device of claim 4, further comprising:
   a processor configured to perform wind processing based on a first microphone signal from the first microphone and a second microphone signal from the third microphone.

7. The image capture device of claim 4, further comprising:
   a processor configured to perform wind processing based on a first microphone signal from the second microphone and a second microphone signal from the third microphone.

8. The image capture device of claim 1, further comprising:
   a processor configured to perform wind processing based on a first microphone signal from the first microphone and a second microphone signal from the second microphone.

9. The image capture device of claim 1, wherein the second microphone port is disposed at a location on the second surface that opposes the lens on the first surface.

10. The image capture device of claim 1, wherein the heatsink comprises a metal or a ceramic material.

11. An image capture device, comprising:
    a first microphone fluidly connected to a first microphone port disposed on a first surface of the image capture device;
    a heatsink comprising fins disposed on a second surface of the image capture device;
    a second microphone fluidly connected to a second microphone port disposed on the second surface in a recessed portion of the fins; and
    a third microphone fluidly connected to a third microphone port disposed on a third surface of the image capture device that extends between the first and second surfaces.

12. The image capture device of claim 11, wherein the first microphone and the second microphone are offset diametrically relative to the third surface that is perpendicular to the first surface and the second surface.

13. The image capture device of claim 11, wherein the first and second microphone ports are disposed on opposite sides of a plane that bisects the first and second surfaces of the image capture device.

14. The image capture device of claim 11, further comprising:
    a processor configured to perform wind processing based on a first microphone signal from the first microphone, a second microphone signal from the second microphone, and a third microphone signal from the third microphone.

15. The image capture device of claim 11, further comprising:
    a processor configured to perform wind processing based on a first microphone signal from the first microphone and a second microphone signal from the third microphone.

16. The image capture device of claim 11, further comprising:
    a processor configured to perform wind processing based on a first microphone signal from the second microphone and a second microphone signal from the third microphone.

17. A microphone assembly, comprising:
    a heatsink comprising fins disposed on a surface, wherein the fins form a recessed area between each fin; and
    a microphone fluidly connected to a microphone port disposed on the surface in the recessed area between two fins of the fins.

18. The microphone assembly of claim 17, wherein the heatsink comprises a metal or a ceramic material.

19. The microphone assembly of claim 17, wherein the microphone port is disposed below an outer surface of the fins.

20. The microphone assembly of claim 17, wherein the microphone is disposed in an internal area of a body of a device, and wherein the heatsink forms a portion of the body of the device.

* * * * *